(12) United States Patent
Sako

(10) Patent No.: US 12,254,228 B2
(45) Date of Patent: Mar. 18, 2025

(54) PRINTING APPARATUS AND CONTROL METHOD

(71) Applicant: CANON KABUSHIKI KAISHA, Tokyo (JP)

(72) Inventor: Ritsuto Sako, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/054,048

(22) Filed: Nov. 9, 2022

(65) Prior Publication Data

US 2023/0144820 A1 May 11, 2023

(30) Foreign Application Priority Data

Nov. 11, 2021 (JP) ................................ 2021-183905

(51) Int. Cl.
*G06F 3/12* (2006.01)

(52) U.S. Cl.
CPC .......... *G06F 3/1225* (2013.01); *G06F 3/1288* (2013.01)

(58) Field of Classification Search
CPC .... G06F 3/1225; G06F 3/1288; G06F 3/1203; G06F 3/1285; G06F 3/123; G06F 8/65; H04N 2201/0094; H04N 1/00941; H04N 1/00973

See application file for complete search history.

(56) References Cited

U.S. PATENT DOCUMENTS

| | | | |
|---|---|---|---|
| 9,582,233 B1 | 2/2017 | Osadchyy | |
| 11,671,313 B2 * | 6/2023 | Sako | .................. H04L 41/0806 709/220 |
| 2009/0235242 A1 | 9/2009 | Kawaguchi | |
| 2014/0355049 A1 * | 12/2014 | Hadano | ................. G06F 3/1287 358/1.15 |
| 2017/0090825 A1 * | 3/2017 | Osadchyy | ............. G06F 3/1286 |
| 2017/0277481 A1 * | 9/2017 | Sako | ..................... G06F 3/1287 |
| 2018/0129454 A1 * | 5/2018 | Sako | ..................... G06F 3/1236 |
| 2018/0260172 A1 | 9/2018 | Nakamura | |
| 2022/0272222 A1 * | 8/2022 | Ma | ........................... G06F 8/65 |
| 2023/0120813 A1 * | 4/2023 | Bermundo | ........... G06F 3/1207 358/1.15 |

FOREIGN PATENT DOCUMENTS

JP 2014232512 A 12/2014

* cited by examiner

*Primary Examiner* — Helen Zong
(74) *Attorney, Agent, or Firm* — Canon U.S.A., Inc. IP Division

(57) ABSTRACT

A printing apparatus includes a first acquisition unit configured to acquire information about software applicable to the printing apparatus from a management server, a notification unit configured to transmit the acquired information about the software as a device information notification to the print system, a request unit configured to issue an event request to the print system, a second acquisition unit configured to acquire information about software used for an update from the print system in a case where an event of updating the software based on an operation input to the print system is included in a response received in response to the event request, and an update unit configured to perform processing for updating the software of the printing apparatus based on the information about the software acquired by the second acquisition unit.

6 Claims, 15 Drawing Sheets

FIG.7

| IPP ATTRIBUTE | VALUE |
|---|---|
| 701 — printer-firmware-name | MAIN CONTROLLER |
| 702 — printer-firmware-version | 82.70 |

FIG.8

| IPP ATTRIBUTE | VALUE |
|---|---|
| printer-firmware-name | MAIN CONTROLLER |
| printer-firmware-version | 82.70 |
| printer-firmware-latest-version | 83.00 |

801 — (header row)
811 — (printer-firmware-latest-version row)

```
TOKYO OFFICE PRINTER 1 | PRINTER PROPERTIES
                                                    [ OK ]

902 — PRINTER NAME:              TOKYO OFFICE PRINTER 1
903 — PRINTER ID:                e72f6800-7f18-4cab-acd4-6a3b90b4c055
904 — MODEL:                     PRINTER 2900
905 — PRINTER STATUS:            READY
906 — REGISTRATION DATE:         SEPTEMBER 09, 2021 02:35 UTC
907 — PRINTER FIRMWARE NAME:     MAIN CONTROLLER
908 — PRINTER FIRMWARE VERSION:  82.70
909 — PRINTER FIRMWARE LATEST VERSION:  82.70
```

```
TOKYO OFFICE PRINTER 1 | PRINTER PROPERTIES
                                                    [ OK ]

PRINTER NAME:              TOKYO OFFICE PRINTER 1
       PRINTER ID:                e72f6800-7f18-4cab-acd4-6a3b90b4c055
       MODEL:                     PRINTER 2900
       PRINTER STATUS:            READY
       REGISTRATION DATE:         SEPTEMBER 09, 2021 02:35 UTC
       PRINTER FIRMWARE NAME:     MAIN CONTROLLER
912 — PRINTER FIRMWARE VERSION:   82.70
913 — PRINTER FIRMWARE LATEST VERSION:  83.00  [ UPDATE FRIMWARE ]
                                                              └─ 914
```

FIG.10A

TOKYO OFFICE PRINTER 1 | PRINTER PROPERTIES

[OK]

| | |
|---|---|
| PRINTER NAME: | TOKYO OFFICE PRINTER 1 |
| PRINTER ID: | e72f6800-7f18-4cab-acd4-6a3b90b4c055 |
| MODEL: | PRINTER 2900 |
| PRINTER STATUS: | UPDATING |
| REGISTRATION DATE: | SEPTEMBER 09, 2021 02:35 UTC |
| PRINTER FIRMWARE NAME: | MAIN CONTROLLER |
| PRINTER FIRMWARE VERSION: | 82.70 |
| PRINTER FIRMWARE LATEST VERSION: | 83.00 |

FIG.10B

TOKYO OFFICE PRINTER 1 | PRINTER PROPERTIES

[OK]

| | |
|---|---|
| PRINTER NAME: | TOKYO OFFICE PRINTER 1 |
| PRINTER ID: | e72f6800-7f18-4cab-acd4-6a3b90b4c055 |
| MODEL: | PRINTER 2900 |
| PRINTER STATUS: | READY |
| REGISTRATION DATE: | SEPTEMBER 09, 2021 02:35 UTC |
| PRINTER FIRMWARE NAME: | MAIN CONTROLLER |
| PRINTER FIRMWARE VERSION: | 83.00 |
| PRINTER FIRMWARE LATEST VERSION: | 83.00 |

FIG.15

| IPP ATTRIBUTE | VALUE |
|---|---|
| 1501 — update-time | NOW |
| 1502 — printer-firmware-name | MAIN CONTROLLER |
| 1503 — printer-firmware-version | 83.00 |

PRINTING APPARATUS AND CONTROL METHOD

BACKGROUND OF THE INVENTION

Field of the Invention

The present invention relates to a printing apparatus in a cloud print service, and a control method.

Description of the Related Art

In conventional print services, printing has been performed by a user directly transmitting a print job from a client terminal such as a personal computer (PC) to a printing apparatus. Meanwhile, in recent years, there have been proposed cloud print services using cloud services provided on the Internet.

Now, a processing sequence of the conventionally known cloud printing will be described with reference to FIG. 1. A printing apparatus 101 supports a cloud print function and a Web user interface (UI) function for operating the printing apparatus 101. A client terminal 100 supports a cloud print client function and a Web UI client for operating the above-described Web UI. Further, a cloud print service 102 is the cloud print service on the Internet.

First, a user transmits a cloud print service registration request 111 to the printing apparatus 101 via the Web UI using the Web UI client on the client terminal 100. Upon receiving the request 111, the printing apparatus 101 transmits a cloud print service registration request 112 to the cloud print service 102. Upon receiving the request 112, the cloud print service 102 transmits a cloud print service registration request response 113 containing a registration Uniform Resource Locater (URL) 130 for registration with the cloud print service to the printing apparatus 101. Upon receiving the response 113, the printing apparatus 101 transmits a registration URL display screen information 114 containing the cloud print service registration URL to the client terminal 100 via the Web UI.

Upon receiving the screen information 114, the client terminal 100 displays the registration URL on the Web UI client. The user operates the Web UI client on the client terminal 100 and accesses the displayed registration URL. Accordingly, the client terminal 100 transmits a cloud print service registration approval request 115 containing a cloud account 131 to the cloud print service 102. Upon receiving the registration approval request 115, the cloud print service 102 transmits a cloud print service registration approval response 116 to the client terminal 100. The cloud account 131 indicates a user authorized to use the cloud print service 102, and the user registers a user account with the cloud print service 102 in advance.

The printing apparatus 101 transmits a cloud print service registration check request 117 to the cloud print service 102. Upon receiving the above-described registration check request 117, the cloud print service 102 transmits a cloud print service registration check response 118 containing a cloud printer identification (ID) 132 to the printing apparatus 101. At this stage, the printing apparatus 101 is in a state of being registered with the cloud print service 102, and is in a state of being able to use the cloud print service.

The client terminal 100 transmits a print request 119 containing the cloud printer ID 132, print data 134, and the cloud account 131 to the cloud print service 102.

The printing apparatus 101 transmits a print job request 120 to the cloud print service 102.

The cloud print service 102 transmits a print job response 121 containing the print data 134 and the cloud account 131 to the printing apparatus 101. The printing apparatus 101 prints the received print data 134.

The printing apparatus 101 transmits the print job request 120 in the sequence illustrated in FIG. 1 when the printing apparatus 101 detects that a print job directed to the printing apparatus 101 is transmitted to the cloud print service 102. The method for the detection is performed specifically by the printing apparatus 101 receiving an event notification from the cloud print service 102.

FIG. 2 illustrates a processing sequence of the event notification. The printing apparatus 101 transmits an event acquisition request 201 containing the cloud printer ID 132 and the cloud account 131 to the cloud print service 102. Upon receiving the event acquisition request 201, the cloud print service 102 maintains connection. Then, when an event occurs, the cloud print service 102 transmits an event response 202 containing an event type 230 as a response to the event acquisition request 201. The cloud print service 102 continues maintaining the connection even after transmitting the event response 202. The cloud print service 102 transmits an event response to the printing apparatus 101 as need arises when an event occurs.

Information about the event that has occurred is set in the event type 230. Examples thereof include a job reception event indicating that a print job directed to the printing apparatus 101 is received, and a job cancel event of canceling a job already received by the printing apparatus 101. Description about the conventionally known cloud printing has been described above.

Further, conventionally, there has been proposed a system for upgrading the version of software of the printing apparatus supporting the cloud print service. Japanese Patent Application Laid-Open No. 2014-232512 discloses that whether a printing apparatus supports the cloud print service is determined, and software such as firmware is downloaded from a software distribution server set up in advance and is installed in the printing apparatus if the printing apparatus does not support the cloud print service.

However, the version of the software of the printing apparatus may be upgraded from various perspectives such as a measure against security vulnerability, and application thereof to the printing apparatus in operation may be recommended in some cases. In this regard, Japanese Patent Application Laid-Open No. 2014-232512 determines whether to update the software based on whether the present software supports the cloud print service, and therefore leaves room for improvement with respect to the determination criteria thereof.

SUMMARY OF THE INVENTION

According to an aspect of the present invention, a printing apparatus configured to communicate with a print system configured to provide a print service via a network includes a first acquisition unit configured to acquire information about software applicable to the printing apparatus from a management server configured to manage software of the printing apparatus, a notification unit configured to transmit the acquired information about the software as a device information notification to the print system, a request unit configured to issue an event request to the print system, a second acquisition unit configured to acquire information about software used for an update from the print system in a case where an event of updating the software based on an operation input to the print system is included in a response received in response to the event request, and an update unit configured to perform processing for updating the software of the printing apparatus based on the information about the software acquired by the second acquisition unit.

Further features of the present invention will become apparent from the following description of embodiments with reference to the attached drawings.

BRIEF DESCRIPTION OF THE DRAWINGS

FIG. 7 illustrates software information transmitted from the printing apparatus according to the present embodiment.

FIG. 8 illustrates latest software information transmitted from the printing apparatus according to the present embodiment.

FIGS. 9A and 9B each illustrate a management screen of a cloud print service according to the present embodiment.

FIGS. 10A and 10B each illustrate a screen when the software is updated on the management screen of the cloud print service according to the present embodiment.

FIG. 15 illustrates software (SW) update information transmitted from the cloud print service to the printing apparatus.

DESCRIPTION OF THE EMBODIMENTS

In the following description, embodiments for implementing the present invention will be described with reference to the drawings. However, the embodiments that will be described below are not intended to limit the present invention defined in the claims, and further, not all combinations of features that will be described in the embodiments are necessarily essential to the solution of the present invention. Each of the embodiments of the present invention described below can be implemented solely or as a combination of a plurality of the embodiments or features thereof where necessary or where the combination of elements or features from individual embodiments in a single embodiment is beneficial.

Further, the following embodiments are directed to providing a mechanism to, with respect to software of a printing apparatus supporting a cloud print service, perform an appropriate software update in accordance with an administrator's instruction from a cloud print management server on the printing apparatus.

Figure 3A:
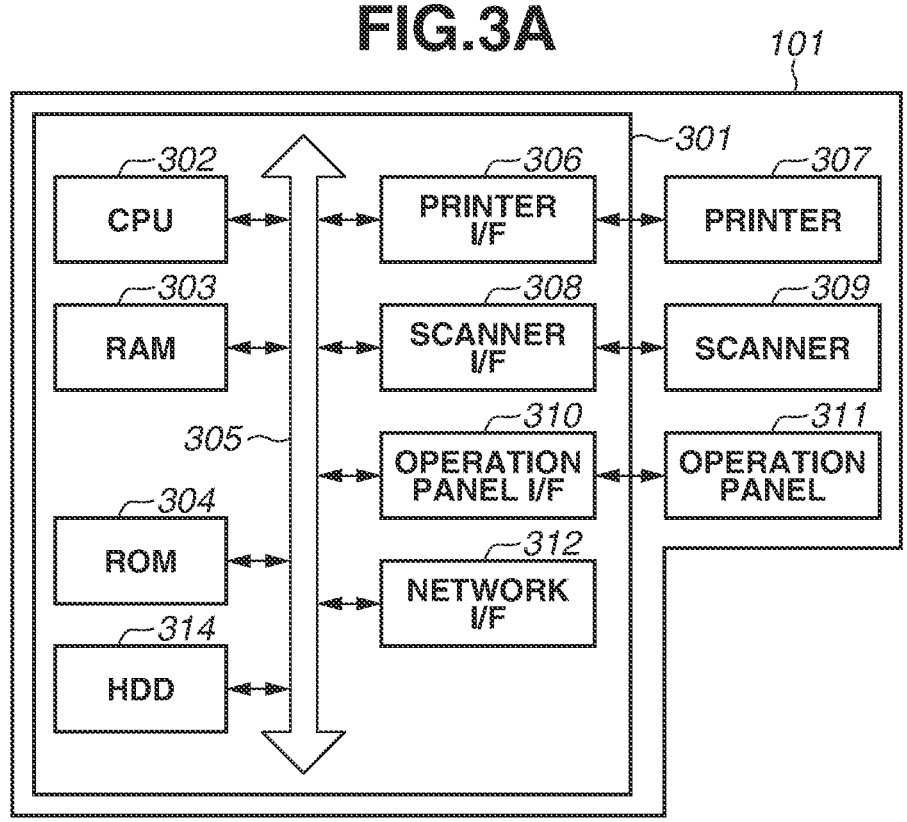
FIGS. 3A and 3B illustrate examples of hardware configurations of a printing apparatus and a server apparatus.

First, FIG. 3A is a block diagram illustrating a hardware configuration of a printing apparatus 101 according to an embodiment of the present invention. A control unit 301 including a central processing unit (CPU) 302 controls operation of the entire printing apparatus 101. The CPU 302 reads a control program stored in a read only memory (ROM) 304 and performs various kinds of control such as communication control. A random access memory (RAM) 303 is a main memory and is used as a temporary storage area such as a work area of the CPU 302. A hard disk drive (HDD) 314 stores data, various kinds of programs, or various kinds of information tables therein. The programs stored in the printing apparatus 101, read into the memory, and executed by the CPU 302 include programs for implementing processing illustrated in sequences and flowcharts that will be described below.

A printer interface (I/F) 306 serves as an interface that outputs an image signal to a printer 307 (a printer engine). Further, a scanner I/F 308 serves as an interface that inputs a read image signal from a scanner 309 (a scanner engine). The CPU 302 processes the image signal input from the scanner I/F 308 and outputs the image signal to the printer I/F 306 as a recording image signal. An operation panel I/F 310 connects an operation panel 311 and the control unit 301 to each other. The operation panel 311 is equipped with a liquid crystal display unit having a touch panel function, a keyboard, and the like. A network I/F 312 transmits information to an external terminal such as a client terminal 100 or a cloud print service 102, or receives various kinds of information from the external apparatus. Each block in the control unit 301 is connected via a system bus 305.

Figure 3B:
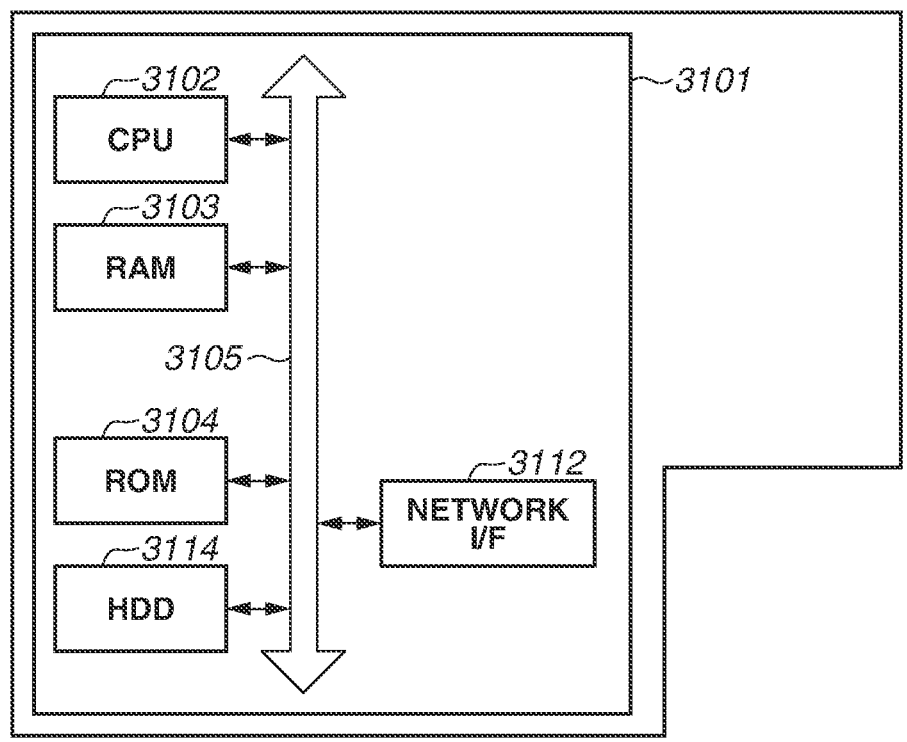

FIG. 3B is a block diagram illustrating an example of a hardware configuration of a server apparatus in which the cloud print service 102 according to the present embodiment is executed. The cloud print service 102 may be a type of service provided as a virtual server using part of hardware resources provided by a plurality of server apparatuses including a data center and the like. Further, a software management server (SW management server) 501 also has the hardware configuration illustrated in FIG. 3B.

A control unit 3101 including a CPU 3102 controls operation of the entire cloud print service 102. The CPU 3102 reads a control program stored in a ROM 3104 and performs various kinds of control such as communication control. A RAM 3103 is a main memory and is used as a temporary storage area such as a work area of the CPU 3102. An HDD 3114 stores data, various kinds of programs, or various kinds of information tables therein. The programs stored in the server apparatus as the cloud print service 102 or the SW management server 501, read into the memory, and executed by the CPU 3102 include programs for implementing the processing illustrated in the sequences that will be described below. A network I/F 3112 transmits information to an external terminal such as the client terminal 100 or the printing apparatus 101, or receives various kinds of information from the external apparatuses.

Each block in the control unit 3101 is connected via a system bus 3105.

Figure 4A:
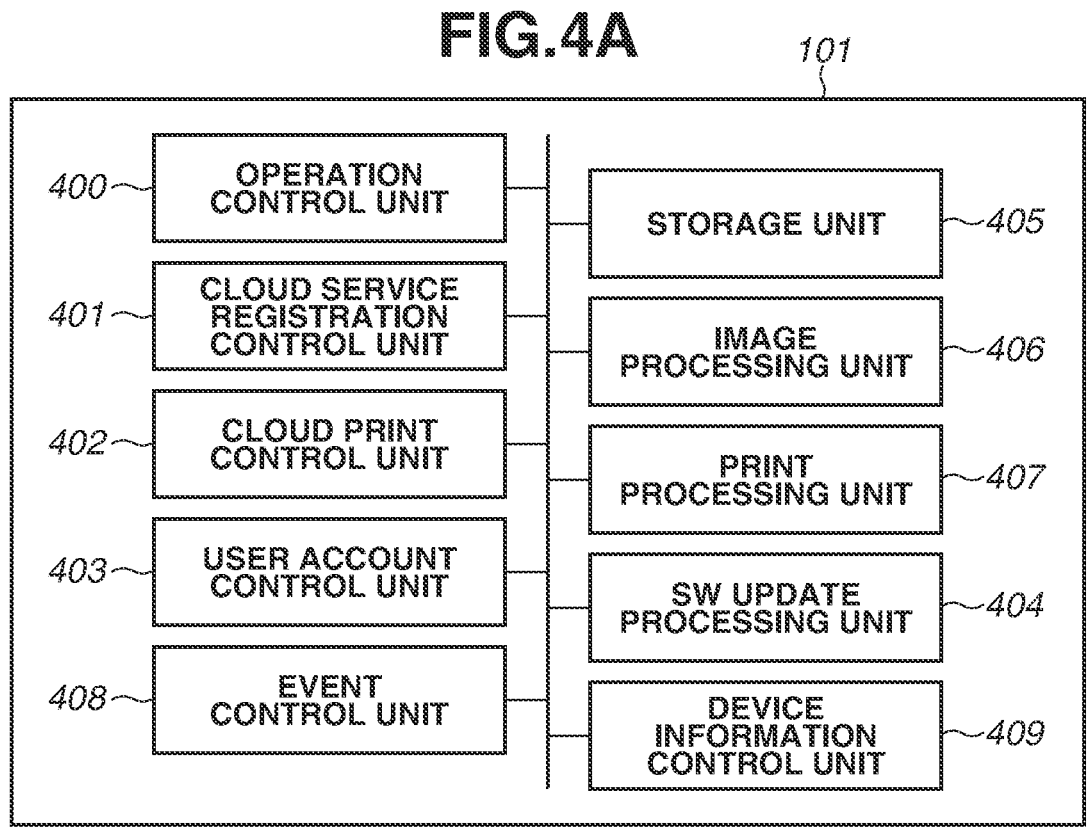
FIGS. 4A and 4B illustrate examples of software configurations of the printing apparatus and a cloud print server.

FIG. 4A illustrates a software configuration of the printing apparatus 101. The CPU 302 included in the printing apparatus 101 executes the control program, by which each functional unit illustrated in FIG. 4A is implemented.

An operation control unit 400 controls the operation panel 311. The operation control unit 400 displays an operation menu on the operation panel 311 and waits for an input of an instruction from a user, notifies another functional unit of the content of the received instruction, and displays an instruction result on the operation panel 311.

A cloud service registration control unit 401 analyzes a cloud print service registration request 111 received from the client terminal 100, and transmits a cloud print service registration request 112 to the cloud print service 102. By the operation, the cloud service registration control unit 401 controls cloud print service registration processing.

A cloud print control unit 402 controls processing for transferring print data 134 received from the cloud print service 102 together with a print instruction to an image processing unit 406.

An event control unit 408 controls processing for transmitting an event and receiving an event between the printing apparatus 101 and the cloud print service 102. A device information control unit 409 controls processing for managing device information of the printing apparatus 101 and notifying the cloud print service 102 of the device information.

A storage unit 405 stores specified data in the ROM 304 or the HDD 314 or reads stored data therefrom according to an instruction from another functional unit. Examples of the data managed by the storage unit 405 include user management information of the printing apparatus 101.

The image processing unit 406 performs processing for rendering a print job into image data for printing. A print processing unit 407 performs processing for transmitting the image data rendered by the image processing unit 406 to the printer 307 via the printer I/F 306 as an image signal, and printing it.

A user account control unit 403 manages user account information stored in the storage unit 405.

A software (SW) update processing unit 404 controls processing for updating software such as firmware and an application of the printing apparatus 101.

Figure 4B:
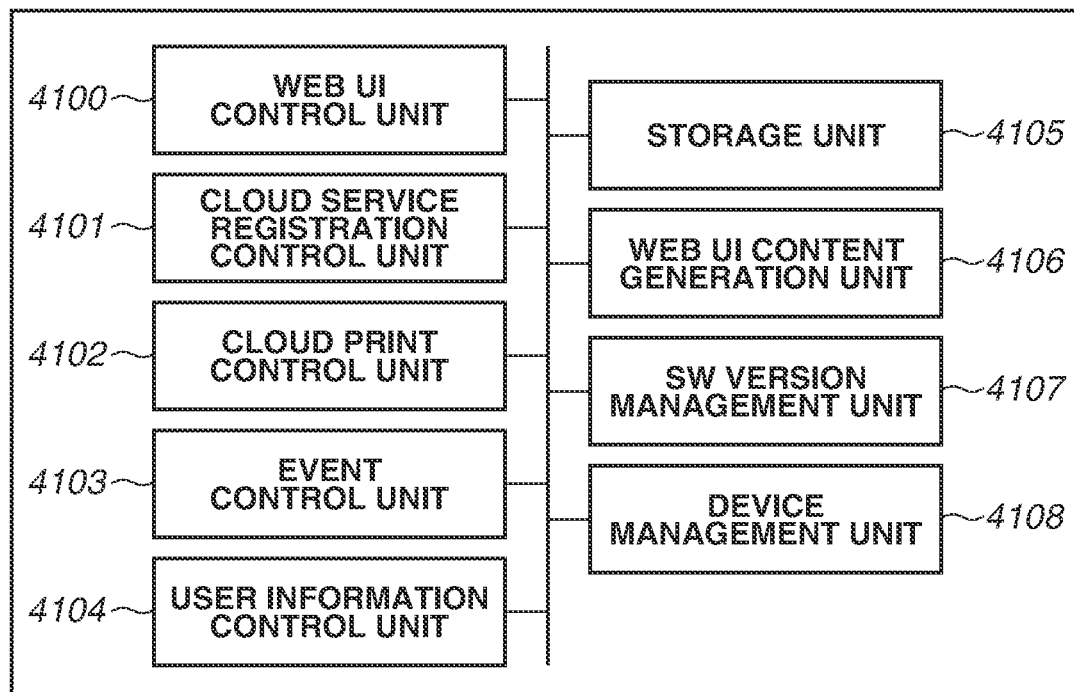

FIG. 4B illustrates a software configuration of a cloud server on which the cloud print service 102 is executed. The CPU 3102 included in the cloud server executes the control program, by which each functional unit illustrated in FIG. 4B is implemented.

A Web UI control unit 4100 controls processing for carrying out Web Communication via the network I/F 3112 and providing a UI on a browser or the like executed on a computer of the user. A Web UI content generation unit 4106 controls processing for generating a Web UI content to be transmitted by the Web UI control unit 4100.

A cloud service registration control unit 4101 performs processing for receiving the cloud print service registration request 112 from the printing apparatus 101 and registering the printing apparatus 101 with the cloud print service 102. A cloud print control unit 4102 controls processing for receiving a print request 119 from the client terminal 100 and transmitting the print data 134 contained in the print request 119 to the printing apparatus 101. An event control unit 4103 performs processing for receiving an event acquisition request 201 from the printing apparatus 101 and transmitting an event response 202 or 203 depending on whether an event has occurred.

A device management unit 4108 controls processing for managing a plurality of printing apparatuses 101 registered with the cloud print service 102. More specifically, the device management unit 4108 stores and manages information such as an SW version of each printing apparatus.

A storage unit 4105 stores specified data in the ROM 3104 or the HDD 3114 or reads stored data therefrom according to an instruction from another functional unit. Examples of the data managed by the storage unit 4105 include the print data 134, event information, and information about the registered printing apparatus 101.

An SW version management unit 4107 manages whether a newer SW version than the SW version in operation is released based on the information about the printing apparatus 101 stored in the storage unit 4105. The Web UI content generation unit 4106 controls whether to display an SW update button based on version information managed by the SW version management unit 4107. A user information control unit 4104 performs control of managing a user and authorization thereof, and determining whether information about the user instructing the cloud print service 102 to update the SW, which is transmitted from the printing apparatus 101, is a user authorized to update the SW.

Figure 5:
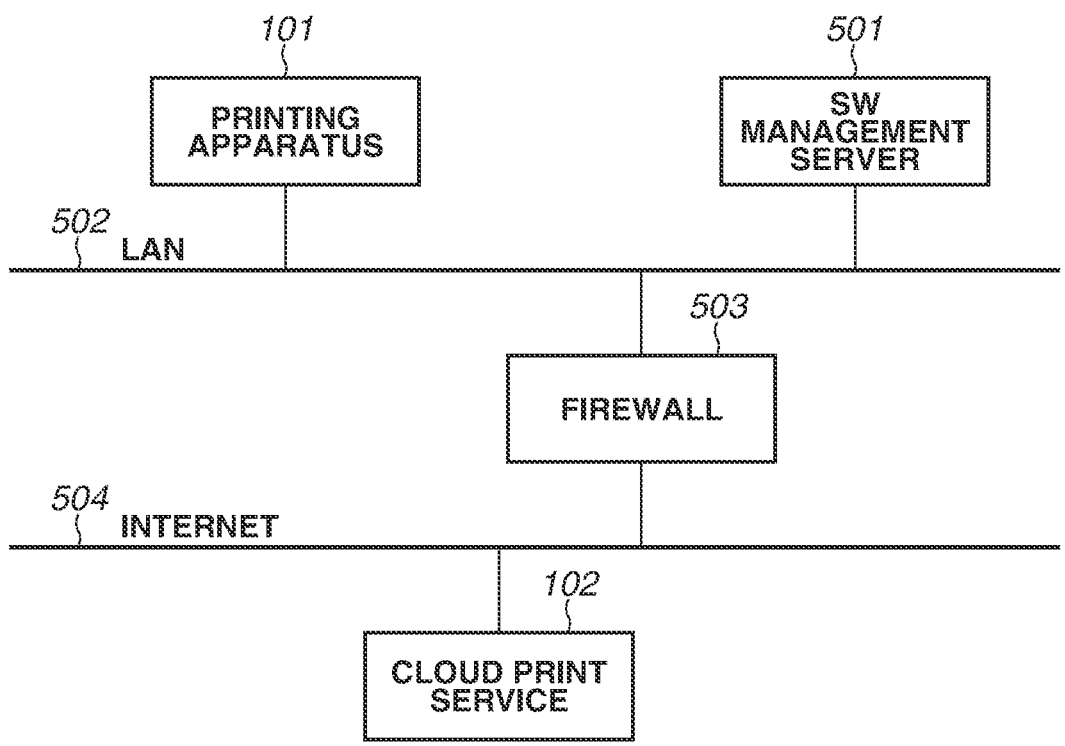
FIG. 5 illustrates a network configuration according to an embodiment of the present invention.

FIG. 5 illustrates an example of a network configuration according to the present embodiment.

The network configuration illustrated in FIG. 5 includes a local area network (LAN) 502. The printing apparatus 101 communicates with a SW management server 501 via the LAN 502. The SW management server 501 is a management server that manages information about the firmware and the application of the printing apparatus 101.

The managed information about the firmware includes information about various kinds of firmware, such as a measure against security vulnerability, a performance improvement of network functionality, and an addition of a function, besides firmware for supporting, for example, a version upgrade of the cloud print service 102. The network configuration illustrated in FIG. 5 includes an Internet 504.

The cloud print service 102 is a print system for providing, for example, a print service implemented on one or more servers present on a network such as the Internet 504. The LAN 502 and the Internet 504 are connected via a firewall 503. The present embodiment may be configured in such a manner that the SW management server 501 is disposed on the Internet 504. Alternatively, the present embodiment may be configured in such a manner that the SW management server 501 and the cloud print service 102 are provided on the same server.

Figure 6:
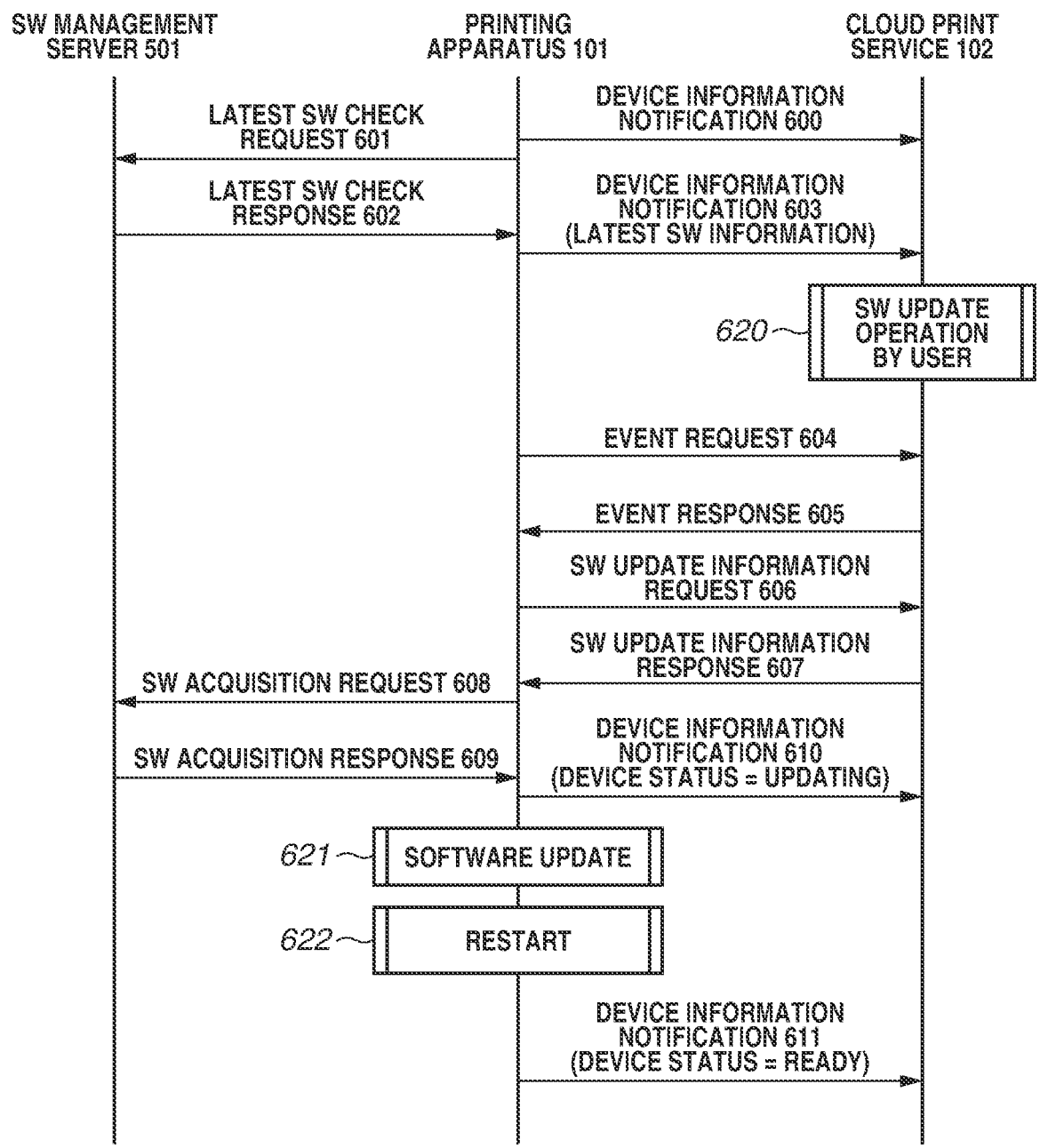
FIG. 6 is a sequence diagram from a startup of the printing apparatus until an update of software according to the present embodiment.

FIG. 6 is a sequence diagram from a startup of the printing apparatus 101 until an update of the software according to the present embodiment.

The printing apparatus 101 transmits a device information notification 600 to the cloud print service 102 when being started up (for example, when being powered on or returns from a sleep). The above-described device information notification 600 contains all pieces of device information of the printing apparatus 101. The above-described device information contains the name and the version information of the software installed in the printing apparatus 101.

The printing apparatus 101 transmits a latest SW check request 601 to the SW management server 501. The SW management server 501 transmits a latest SW check response 602 to the printing apparatus 101 as a response to the above-described request 601.

The printing apparatus 101 receives the latest SW check response 602, and transmits latest SW information acquired from the response to the cloud print service 102 as a device information notification 603. The latest SW information contains information such as the name and the version of the SW applicable to the printing apparatus 101.

The cloud print service 102 reflects the received latest SW information in a display on a management screen provided by the cloud print service 102. In the present embodiment, an SW update operation 620 on the above-described management screen by the user is received thereon.

The printing apparatus 101 transmits an event request 604 to the cloud print service 102. The event request 604 may be regularly issued or may be issued at predetermined frequency during a predetermined period after the device information notification 603. The cloud print service 102 transmits an event response 605 to the printing apparatus 101 as a response to the event request 604. In a case where the user instructs the cloud print service 102 to update the SW by the above-described SW update operation 620, the event response 605 contains an SW update event based on the operation.

The printing apparatus 101 checks the content of the above-described received event response 605, and transmits an SW update information request 606 to the cloud print service 102 if detecting the SW update event. The cloud print service 102 transmits an SW update information response 607 to the printing apparatus 101 as a response to the request 606. The SW update information response 607 contains the name and the version of the SW to update.

The printing apparatus 101 receives the SW update information response 607, and transmits an SW acquisition request 608 to the SW management server 501 based on SW update information contained in the response 607. The SW management server 501 transmits an SW acquisition response 609 to the printing apparatus 101 as a response thereto. The SW acquisition response 609 contains an SW identified with the name and the version specified by the printing apparatus 101 in the SW acquisition request 608.

The printing apparatus 101 transmits a device information notification 610 to the cloud print service 102. The device information notification 610 contains a device status, and "Updating" (update ongoing) is set in the device status.

The printing apparatus 101 performs an update (621) of the software of the printing apparatus 101 with the software received via the SW acquisition response 609. The update processing is accompanied by a restart 622 of the printing apparatus 101. As a result of the restart 622, the printing apparatus 101 operates using the updated software. After the restart 622, the printing apparatus 101 transmits a device information notification 611 to the cloud print service 102. The device information notification 611 contains the device status, and "Ready" is set in the device status. The status "Ready" here serves as information indicating that the software update processing is completed and the printing apparatus 101 returns to a normal state.

In the following description, the present embodiment will be described citing Internet Printing Protocol (IPP) defined in Request for Comments (RFC) 8011 and Printer Working Group (PWG) 5100.18 as an example of a communication protocol between the printing apparatus 101 and the cloud print service 102. The printing apparatus 101 and the SW management server 501 communicate with each other using, for example, Hypertext Transfer Protocol (HTTP).

FIG. 7 illustrates software information transmitted from the printing apparatus 101 according to the present embodiment. The software information described here is information transmitted in the device information notification 600.

In IPP, the device information notification is carried out using an operation Update-Output-Device-Attributes. Examples of IPP attributes transmitted using Update-Output-Device-Attributes include printer-firmware-name 701, which indicates the software name, and printer-firmware-version 702, which indicates the software version. In the present embodiment, values Main Controller and 82.70 are set in these IPP attributes, respectively. A plurality of software applications may be present. In this case, a plurality of values is set in each of the printer-firmware-name 701 and the printer-firmware-version 702.

FIG. 8 illustrates latest software information 801 transmitted from the printing apparatus 101 according to the present embodiment. The latest software information 801 described here is the information transmitted via the device information notification 603.

One of the IPP attributes transmitted using Update-Output-Device-Attributes is printer-firmware-latest-version 811, which indicates the latest software version. In the present embodiment, the latest software information 801 indicates that the version of Main Controller currently running on the printing apparatus 101 is 82.70, and the latest version of Main Controller is 83.00.

FIGS. 9A and 9B illustrates a management screen of the cloud print service 102 according to the present embodiment. The above-described SW update operation 620 illustrated in FIG. 6 is received on one screen of the management screen provided by the cloud print service 102.

The management screen is displayed by the user accessing the cloud print service 102 via the browser or the like. The information displayed here is information generated by the information transmitted from the printing apparatus 101 using Update-Output-Device-Attributes and the information managed by the cloud print service 102 merging together.

A management screen 901 is displayed on the cloud print service 102 when the software of the printing apparatus 101 is software of the latest version. The printer name is displayed in 902. The printer ID for uniquely identifying the printing apparatus 101 registered with the cloud print service 102 is displayed in 903. The model name of the printing apparatus 101 is displayed in 904. The status of the printing apparatus 101 is displayed in 905. The status of the printing apparatus 101, Ready, indicates that the printing apparatus 101 is in a state ready for printing. The date and time of registration of the printing apparatus 101 with the cloud print service 102 is displayed in 906. The software name of the printing apparatus 101 is displayed in 907. The software version of the printing apparatus 101 is displayed in 908. The latest version of the software indicated in the software name 907 is displayed in 909.

A management screen 911 is also displayed on the cloud print service 102 similarly to the management screen 901, but is a management screen when a newer version of the software than that of the software of the printing apparatus 101 is available. The software version of the printing apparatus 101 displayed in a software version 912 is 82.70.

On the other hand, the latest software version displayed in a latest version 913 is 83.00.

When a newer version of the software than that of the software of the printing apparatus 101 is available, an Update Firmware button 914 is displayed. By the user issuing an instruction by operating the button 914, the SW update operation 620 illustrated in FIG. 6 is implemented, and the update of the software of the printing apparatus 101 is performed.

FIGS. 10A and 10B illustrates a screen when the software is updated on the management screen of the cloud print service 102 according to the present embodiment.

When the Update Firmware button 914 is pressed on the management screen 911 illustrated in FIG. 9B, the printing apparatus 101 starts the software update processing, and transmits the device information notification 610 to the cloud print service 102. Upon receiving the device information notification 610, the cloud print service 102 displays a management screen 1001 on the management screen. The status of the printer is set to Updating in a status 1002, indicating that the printing apparatus 101 is currently in a software updating state.

Upon completing the update of the software of the printer, the printing apparatus 101 transmits the device information notification 611 to the cloud print service 102. Upon receiving the device information notification 611, the cloud print service 102 displays a management screen 1011 on the management screen. The status of the printer is changed to Ready in a status 1012, indicating that the printing apparatus 101 is in the state ready for printing. Further, the version of the printer is changed to 83.00 as in a software version 1013, indicating that the software is updated to the latest version.

Figure 11:
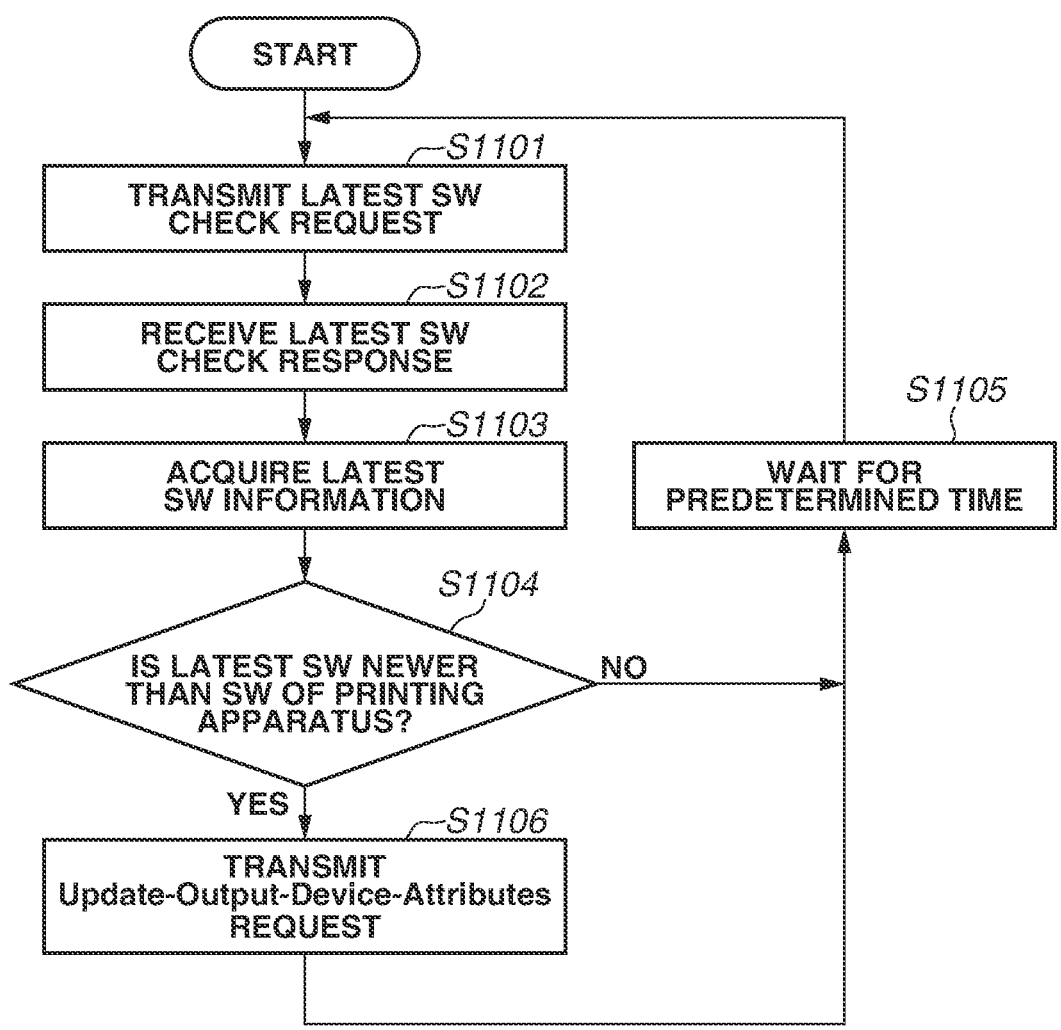
FIG. 11 is a flowchart when the printing apparatus checks for the latest software.

FIG. 11 is a flowchart illustrating processing when the printing apparatus 101 checks for the latest software.

In step S1101, the SW update processing unit 404 of the printing apparatus 101 transmits the latest SW check request 601 to the SW management server 501. In step S1102, the SW update processing unit 404 of the printing apparatus 101 receives the latest SW check response 602 from the SW management server 501. In step S1103, the SW update processing unit 404 of the printing apparatus 101 acquires the latest software information contained in the above-described response 602. The latest software information contains various kinds of information, such as identification information such as the name of the software, the type of the software, and the version information of the software.

In step S1104, the SW update processing unit 404 of the printing apparatus 101 determines whether the software version contained in the latest software information is newer than the software version of the printing apparatus 101. If the software version contained in the latest software information is not newer than the software version of the printing apparatus 101 (NO in step S1104), in step S1105, the printing apparatus 101 waits for a predetermined time. After that, the processing is repeated from step S1101 again. If the software version contained in the latest software information is newer than the software version of the printing apparatus 101 (YES in step S1104), in step S1106, the device information control unit 409 of the printing apparatus 101 transmits the latest software information described with reference to FIG. 8 to the cloud print service 102 using Update-Output-Device-Attributes, which is an operation of IPP.

Then, in step S1105, the printing apparatus 101 waits for the predetermined time. After that, the processing is repeated from step S1101 again.

Figure 1:
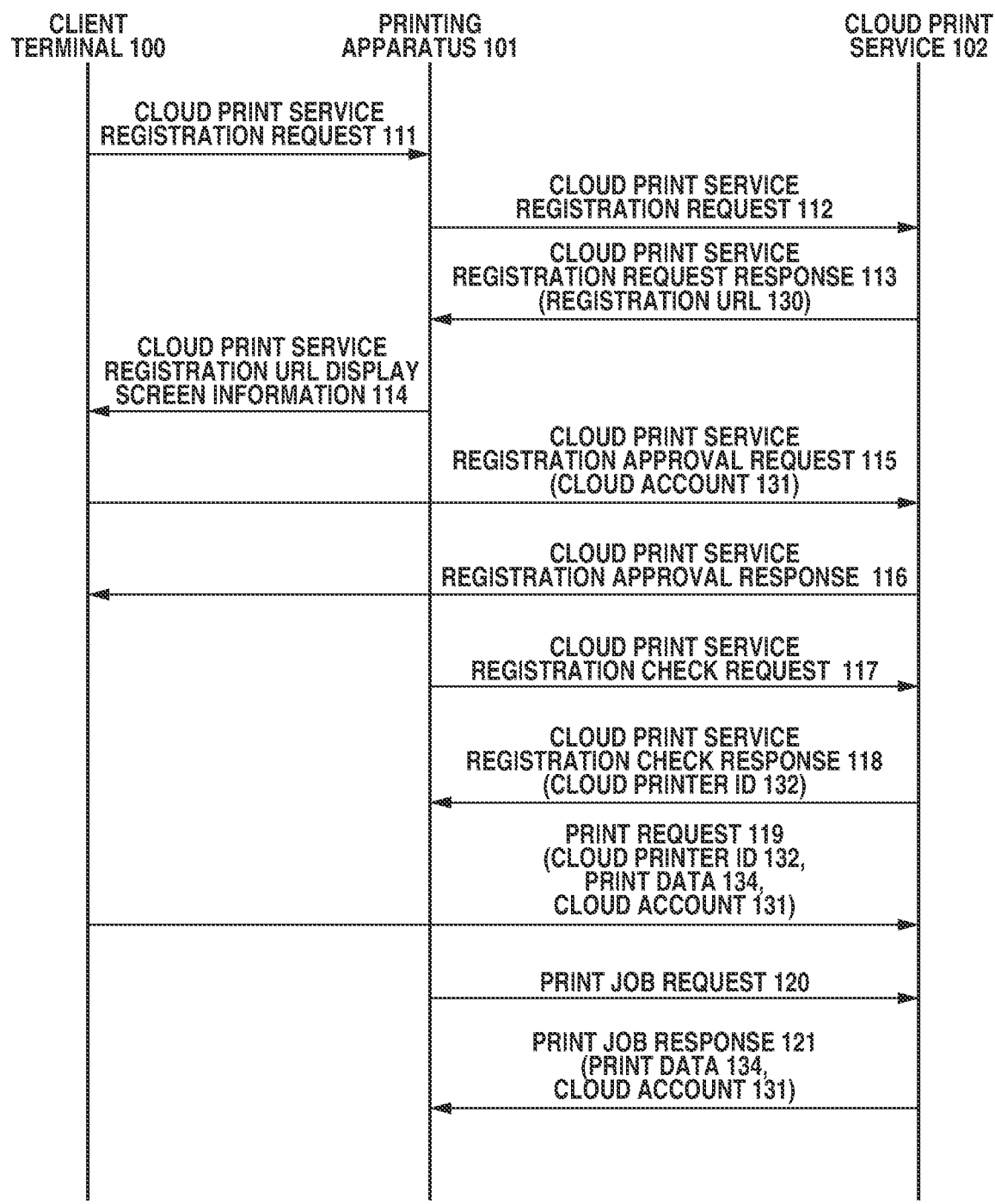
FIG. 1 is a processing sequence diagram of conventional cloud printing.
Figure 2:
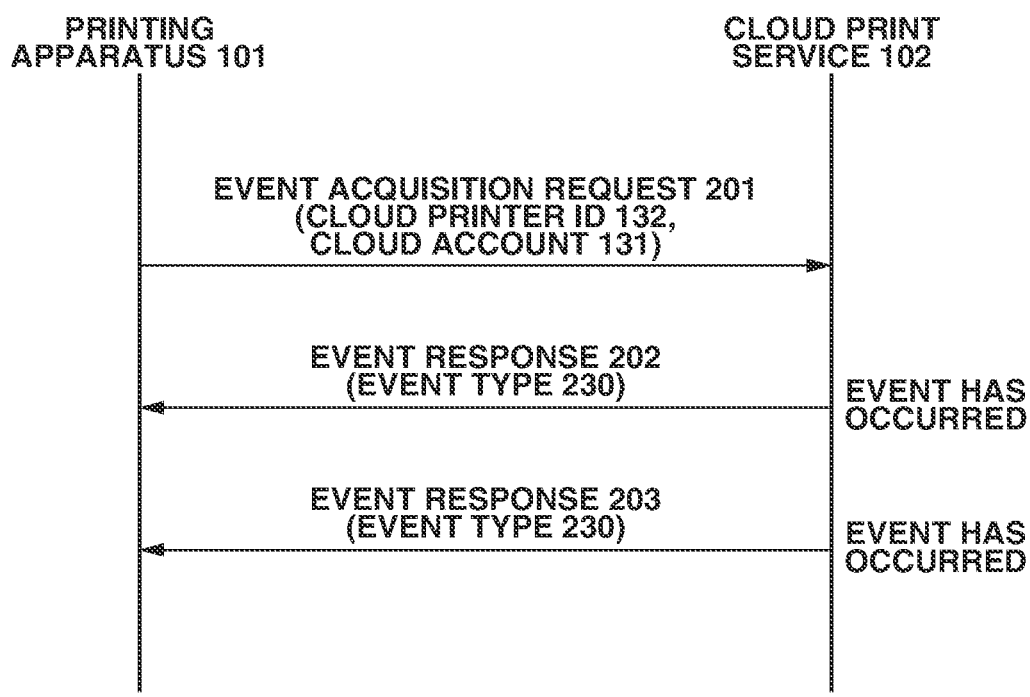
FIG. 2 is a processing sequence diagram of an event notification of the conventional cloud printing.
Figure 12:
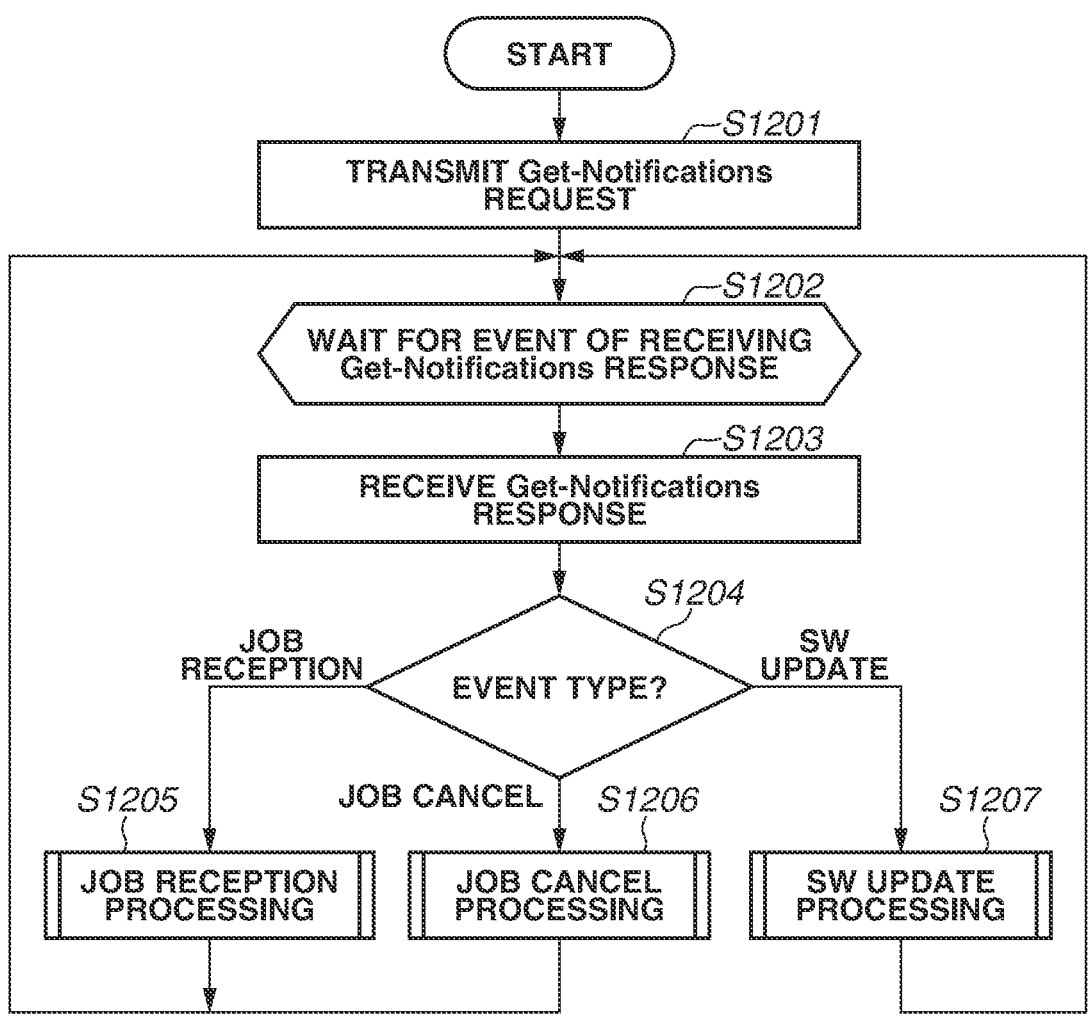
FIG. 12 is a flowchart when the printing apparatus performs event processing.

FIG. 12 is a flowchart illustrating processing when the printing apparatus 101 performs event processing. The printing apparatus 101 implements event reception from the cloud print service 102 by maintaining the communication connection as described with reference to FIG. 2.

In step S1201, the event control unit 408 of the printing apparatus 101 transmits a Get-Notifications request, which is an operation of IPP, to the cloud print service 102. The event control unit 408 of the printing apparatus 101 maintains the connection used at the time of the above-described transmission. In step S1202, the event control unit 408 waits for an event of receiving a Get-Notifications response.

In step S1203, the event control unit 408 of the printing apparatus 101 receives the Get-Notifications response when the reception event occurs. In step S1204, the event control unit 408 of the printing apparatus 101 determines the type of the received event.

If the event type is job reception (JOB RECEPTION in step S1204), in step S1205, the cloud print control unit 402 of the printing apparatus 101 performs job reception processing. When receiving a job from the cloud print service 102, the printing apparatus 101 performs print processing based on the content of the job.

If the event type is job cancel (JOB CANCEL in step S1204), in step S1206, the cloud print control unit 402 of the printing apparatus 101 performs job cancel processing.

If the event type is an SW update (SW UPDATE in step S1204), in step S1207, the SW update processing unit 404 of the printing apparatus 101 performs the software update processing. The processing will be described in detail with reference to FIG. 13.

The event reception may be implemented by a method that conducts polling for an event instead of the method that maintains the communication connection.

Figure 13:
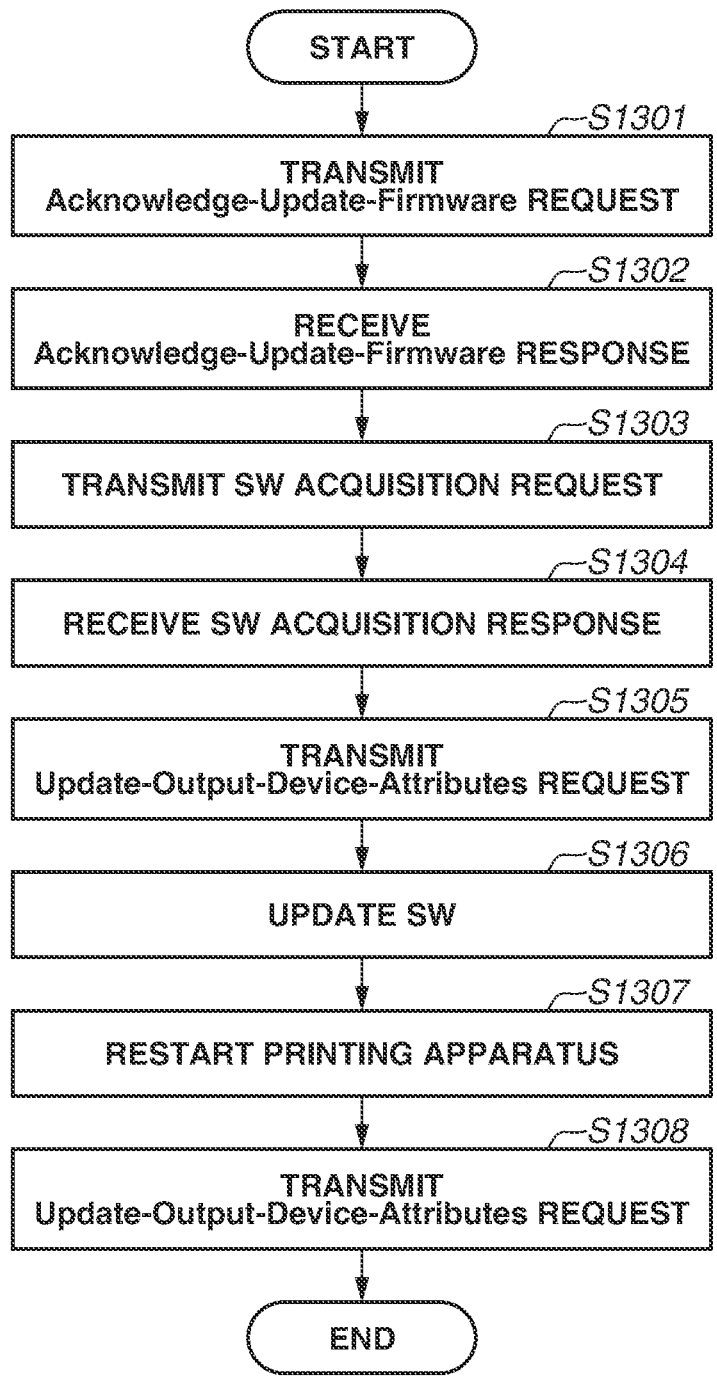
FIG. 13 is a flowchart when the printing apparatus performs software update processing.

FIG. 13 is a flowchart illustrating details of the software update processing by the printing apparatus 101. The software update processing that will be described here is an elaboration of the processing in step S1207 in the flowchart illustrated in FIG. 12.

In step S1301, the SW update processing unit 404 of the printing apparatus 101 transmits an Acknowledge-Update-Firmware request, which is an operation of IPP, to the cloud print service 102, and requests detailed information for the SW update. In step S1302, the SW update processing unit 404 of the printing apparatus 101 receives SW update information that will be described with reference to FIG. 15 from the cloud print service 102 as a response to the Acknowledge-Update-Firmware request.

In step S1303, the SW update processing unit 404 of the printing apparatus 101 transmits the SW acquisition request 608 to the SW management server 501. At this time, the SW update processing unit 404 requests the software by specifying the identification information (the name or the like) and the version information of the software based on the SW update information acquired in step S1302. In step S1304, the SW update processing unit 404 of the printing apparatus 101 receives the software specified in step S1303 from the SW management server 501.

In step S1305, the device information control unit 409 of the printing apparatus 101 transmits an Update-Output-Device-Attributes request, which is an operation of IPP, to the cloud print service 102. The Update-Output-Device-Attributes request contains the device status as the IPP attribute, and the value thereof is set to "Updating".

In step S1306, the SW update processing unit 404 of the printing apparatus 101 updates the software of the printing apparatus 101 with the software acquired in step S1304. When the update is completed, in step S1307, the SW update processing unit 404 of the printing apparatus 101 restarts the printing apparatus 101. After the restart is completed, in step S1308, the device information control unit 409 of the printing apparatus 101 transmits an Update-Output-Device-Attributes request to the cloud print service 102. The Update-Output-Device-Attributes request contains the device status as the IPP attribute, and the value thereof is set to "Ready".

Now, user authentication can be conducted by two methods.

(1) User Authentication by Cloud Print Service

In step S1301, the SW update processing unit 404 of the printing apparatus 101 transmits the Acknowledge-Update-Firmware request while adding requesting-user-uri thereto as user information. Then, the cloud print service 102 determines whether the user information that the cloud print service 102 is notified of is about a user authorized to update the SW in the cloud print service 102. At this time, if the user is authorized to update the SW, the cloud print service 102 returns an Acknowledge-Update-Firmware response as described above. If the user is not authorized to update the SW, the cloud print service 102 returns a client-error-not-authorized as an error response to the above-described request.

(2) User Authentication by Printing Apparatus

In step S1302, the cloud print service 102 transmits the Acknowledge-Update-Firmware response while adding update-operating-user-uri thereto as the user information. Then, the printing apparatus 101 determines whether the user information that the printing apparatus 101 is notified of is about a user authorized to update the SW in the printing apparatus 101. At this time, if the user is authorized to update the SW, in step S1303, the printing apparatus 101 continues the SW update processing. If the user is not authorized to update the SW, the printing apparatus 101 cancels the SW update processing and ends the processing.

Figure 14:
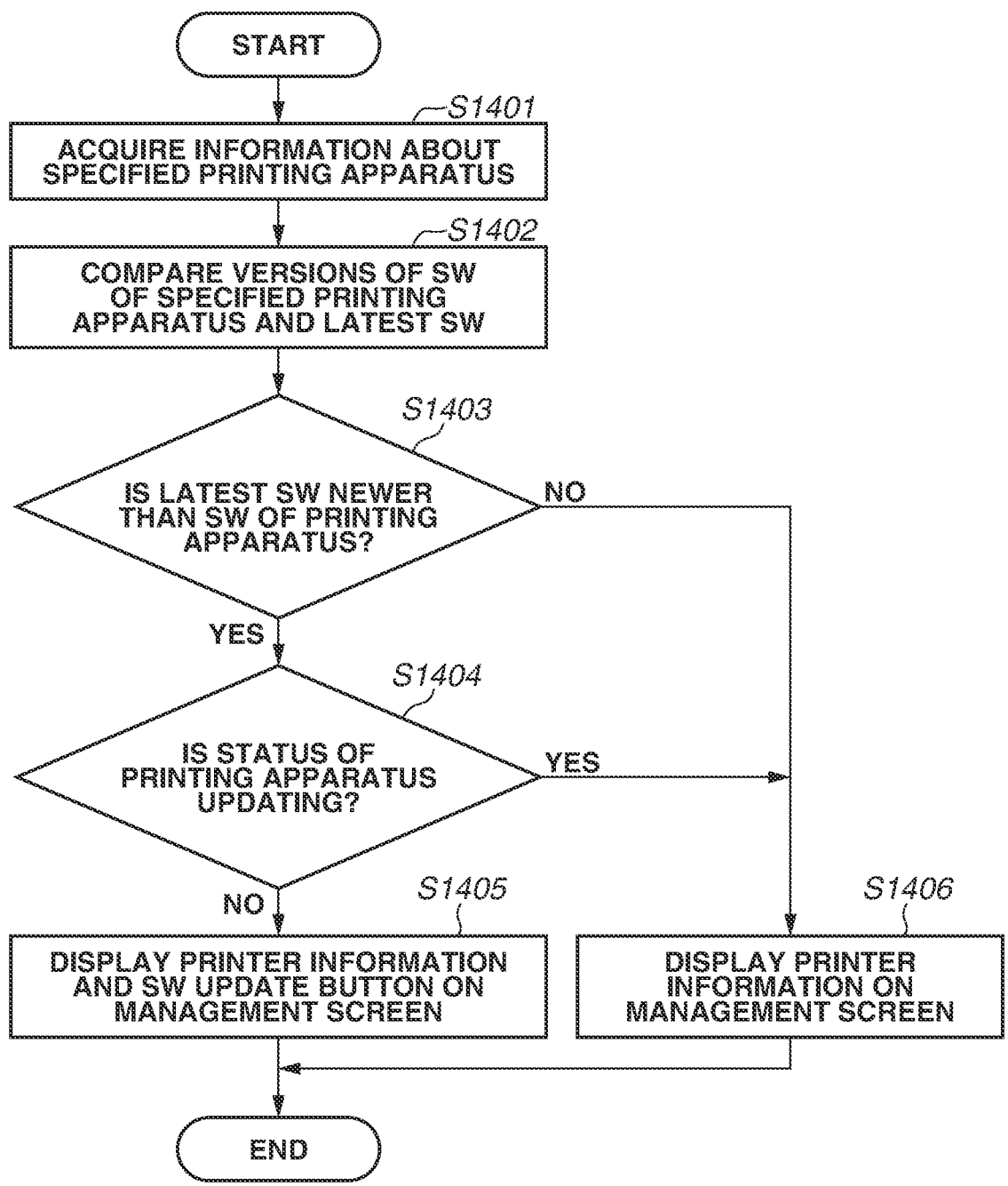
FIG. 14 is a flowchart when the management screen is displayed on the cloud print service.

FIG. 14 is a flowchart illustrating processing when the management screen is displayed on the cloud print service 102. The management screen refers to the management screen described with reference to FIGS. 9A, 9B, 10A, and 10B.

In step S1401, the cloud print service 102 acquires the information about the specified printing apparatus from printer information managed by the cloud print service 102. In step S1402, the cloud print service 102 compares the versions of the software of the specified printing apparatus and the latest software. In step S1403, if the latest software is newer than the software of the printing apparatus as a result of the comparison between the versions of the software of the specified printing apparatus and the latest software in step S1403 (YES in step S1403), the cloud print service 102 performs the processing in step S1404. If not (NO in step S1403), in step S1406, the cloud print service 102 displays the printer information on the management screen.

In step S1404, the cloud print service 102 determines whether the status of the specified printing apparatus is "Updating". If the status of the printing apparatus is "Updating" (YES in step S1404), in step S1406, the cloud print service 102 displays the printer information on the management screen. If the status of the printing apparatus is not "Updating" (NO in step S1404), in step S1405, the cloud print service 102 displays the printer information on the management screen and also displays a software update button at the same time.

FIG. 15 illustrates the SW update information transmitted from the cloud print service 102 to the printing apparatus 101. The present information is the information transmitted from the cloud print service 102 to the printing apparatus 101 as the response to the Acknowledge-Update-Firmware request described with reference to FIG. 13.

An item 1501 indicates the time at which the software is to be updated. The item 1501 set to "Now" means that the software is to be updated immediately. The software can also be updated at a freely-selected time by setting the date and time. An item 1502 indicates the name of the software to update. An item 1503 indicates the version to which the software is to be updated.

One embodiment of the present invention can also include an apparatus or a system having a configuration that is a combination of configurations according to the above-described embodiments as appropriate, and a method therefor.

Herein, one embodiment of the present invention is an apparatus or a system serving as an entity that executes at least one software application (program) capable of implementing a function of the above-described embodiments.

Further, one embodiment of the present invention is a method for realizing the above-described embodiments executed on the apparatus or the system. The program is supplied to the system or the apparatus via a network or various kinds of storage media, and the program is read into at least one memory and is executed by at least one computer (a CPU, a micro processing unit (MPU), or the like) of the system or the apparatus. In other words, one embodiment of the present invention includes the program, or the various kinds of computer-readable storage media storing the program. Further, one embodiment of the present invention can also be realized by a circuit (for example, an application specific integrated circuit (ASIC)) capable of implementing a function of the above-described embodiments.

According to the embodiments of the present invention, it is possible to provide a mechanism to, with respect to software of a printing apparatus supporting a cloud print service, perform an appropriate software update in accordance with an administrator's instruction from a cloud print management server on the printing apparatus.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2021-183905, filed Nov. 11, 2021, which is hereby incorporated by reference herein in its entirety.

What is claimed is:

1. A printing apparatus configured to communicate with a print system configured to provide a print service via a network, the printing apparatus comprising:
   one or more memories storing instructions; and
   one or more processors capable of executing the instructions causing the printing apparatus to:
   perform registration processing for the print service provided by the print system;
   transmit, as a device information notification, first information about software applicable to the printing apparatus to the print system, wherein the first information is managed by a management server configured to manage software;
   issue an event request to the print system;
   acquire second information about software used for an update from the print system in a case where an update event of updating software that has been installed in the printing apparatus based on an operation input to the print system is included in a response received in response to the event request;
   transmit, to the print system, information indicating that the update is ongoing as a device status before updating processing is performed based on the update event;
   perform the updating processing, wherein the updating processing is performed for updating the software that has been installed in the printing apparatus using software that the printing apparatus acquires from the management server based on the acquired second information; and
   perform job processing in a case where an event of the job processing is included in the response received in response to the event request.

2. The printing apparatus according to claim 1, wherein the software used by the updating processing is acquired by requesting the software from the management server based on the acquired second information.

3. The printing apparatus according to claim 1, wherein the instructions further cause the printing apparatus to transmit, to the print system, information for indicating that the printing apparatus is returned to a normal state as the device status as the device information notification when the processing for updating the software of the printing apparatus is completed.

4. The printing apparatus according to claim 1, wherein the instructions further cause the printing apparatus to acquire the first information about the software from the management server.

5. The printing apparatus according to claim 1, wherein the event of the job processing included in the response indicates a job reception or a job cancel.

6. A control method for a printing apparatus configured to communicate with a print system configured to provide a print service via a network, the control method comprising:

performing registration processing for the print service provided by the print system;

transmitting, as a device information notification, first information about software applicable to the printing apparatus to the print system, wherein the first information is managed by a management server configured to manage software;

issuing an event request to the print system;

acquiring second information about software used for an update from the print system in a case where an update event of updating software that has been installed in the printing apparatus based on an operation input to the print system is included in a response received in response to the event request;

transmitting, to the print system, information indicating that the update is ongoing as a device status before updating processing is performed based on the update event;

performing the updating processing, wherein the updating processing is performed for updating the software that has been installed in the printing apparatus using software that the printing apparatus acquires from the management server based on the acquired second information; and performing job processing in a case where an event of the job processing is included in the response received in response to the event request.

* * * * *